US011232416B2

(12) United States Patent
Moiyallah, Jr. et al.

(10) Patent No.: US 11,232,416 B2
(45) Date of Patent: Jan. 25, 2022

(54) LOCAL EDGE-NODE SERVER

(71) Applicant: Bank of America Corporation, Charlotte, NC (US)

(72) Inventors: Samuel M. Moiyallah, Jr., Newark, DE (US); Joseph Castinado, Northglenn, CO (US)

(73) Assignee: Bank of America Corporation, Charlotte, NC (US)

( * ) Notice: Subject to any disclaimer, the term of this patent is extended or adjusted under 35 U.S.C. 154(b) by 77 days.

(21) Appl. No.: 16/699,682

(22) Filed: Dec. 1, 2019

(65) Prior Publication Data

US 2021/0166205 A1    Jun. 3, 2021

(51) Int. Cl.
| | | |
|---|---|---|
| *G06Q 20/10* | (2012.01) | |
| *G06Q 20/40* | (2012.01) | |
| *G06Q 20/36* | (2012.01) | |
| *G06Q 20/32* | (2012.01) | |
| *G06Q 20/38* | (2012.01) | |

(52) U.S. Cl.
CPC ......... *G06Q 20/10* (2013.01); *G06Q 20/3224* (2013.01); *G06Q 20/3674* (2013.01); *G06Q 20/382* (2013.01); *G06Q 20/40* (2013.01)

(58) Field of Classification Search
CPC .... G06Q 20/10; G06Q 20/40; G06Q 20/3674; G06Q 20/3224; G06Q 20/382
USPC .......................................................... 705/39
See application file for complete search history.

(56) References Cited

U.S. PATENT DOCUMENTS

| | | | | |
|---|---|---|---|---|
| 6,363,488 | B1 * | 3/2002 | Ginter .................... | G06F 21/33 726/1 |
| 9,171,299 | B1 | 10/2015 | Schwartz | |
| 9,799,033 | B2 | 10/2017 | Leighton | |
| 2006/0069926 | A1 * | 3/2006 | Ginter ................ | G06Q 20/1235 713/194 |
| 2007/0226807 | A1 * | 9/2007 | Ginter .................... | G06Q 20/24 726/27 |
| 2013/0204886 | A1 * | 8/2013 | Faith ................... | G06F 16/2379 707/756 |
| 2019/0095992 | A1 * | 3/2019 | Soh ........................ | G07F 19/20 |

(Continued)

OTHER PUBLICATIONS

"Understanding Zelle,"https://www.aba.com/news-research/references-guides/understanding-zelle#:~:text=Zelle%20is%20a%20new%20bank,money%20from%20their%20mobile%20devices.&text=Equipped%20with%20an%20email%20address,regardless%20of%20where%20they%20bank, American Bankers Association, Retrieved on Jul. 17, 2019.

(Continued)

*Primary Examiner* — Lindsay M Maguire
(74) *Attorney, Agent, or Firm* — Weiss & Arons LLP

(57) ABSTRACT

This application describes apparatus and methods for distributing computing resources using edge-computing. Apparatus may include an edge node that is positioned in a target geographic region. The edge-node may include information needed to process transactions that occur locally in the target geographic region. The edge-node may process the transaction without communicating with a central server. The edge-node may support processing transactions on behalf of a variety of financial institutions and merchant processing systems. Processing the transaction locally may reduce computational resources typically required by region server to process high volumes of transactions. The edge-nodes would process transactions locally, close to a location of at least one party to the transaction.

6 Claims, 8 Drawing Sheets

(56) References Cited

U.S. PATENT DOCUMENTS

2020/0402065 A1* 12/2020 Kapur .................... G06Q 20/20

OTHER PUBLICATIONS

"Authorization, Clearing and Settlement: How MasterCard Works," http://blog.unibulmerchantservices.com/authorization-clearing-and-settlement-how-mastercard-works/, UniBul's Money Blog, Retrieved on Oct. 30, 2019.

* cited by examiner

LOCAL EDGE-NODE SERVER

FIELD OF TECHNOLOGY

This application describes apparatus and methods for distributing computing resources using edge-computing.

BACKGROUND

A merchant may operate multiple channels that provide customers with access to goods and services (hereinafter, "products"). A merchant may provide access via an online store. The merchant may provide access via a mobile application. The merchant may provide access via brick and mortar locations.

Each channel utilized by the merchant may have its own set of resource requirements. For example, an online store may need to be hosted by a computer system that provides customers uninterrupted access to the online store. An application may need to be installed on a mobile device that has sufficient computing resources to secure and process customer interactions with the online store. A brick and mortar location may require human resources to adequately service customers.

Typically, a merchant may attempt to allocate resources to each access channel based on characteristics of the channel and customer demand associated with the channel. However, such an approach may cause inefficient use, and potential waste, of important resources. For example, a merchant may estimate that a computer server requires a target amount of resources to meet peak customer demand. Target resources may include memory, processing power and network bandwidth.

Computer servers for processing customer interactions (e.g., purchase transactions) may be built with resources to reliably handle a high volume of transactions. For example, computer systems may receive 150 million transactions per day that require authorization decisions. At peak demand computer systems may receive 65,000 transactions a minute. To consistently meet performance goals, such computer systems may be built with resources to handle 24,000 transactions per second.

However, peak customer demand may only occur for an hour or two during the day. Thus, for most of the day, the merchant has over supplied resources to this access channel. Furthermore, peak customer demand may occur more often than expected. Peak customer demand may exceed allocated resources. Thus, a during peak demand, a customer that attempts to access the access channel may be denied access or receive a delayed response from resources such as a computer server.

It would be desirable to reduce waste associated with underutilized resources. It would be desirable to improve the efficiency of resources deployed to provide customer access to merchant products. It would be desirable to improve utilization of resources deployed by the merchant and improve customer satisfaction and quality of service provided by the merchant.

Accordingly it is desirable to provide apparatus and methods for a LOCAL EDGE-NODE SERVER.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
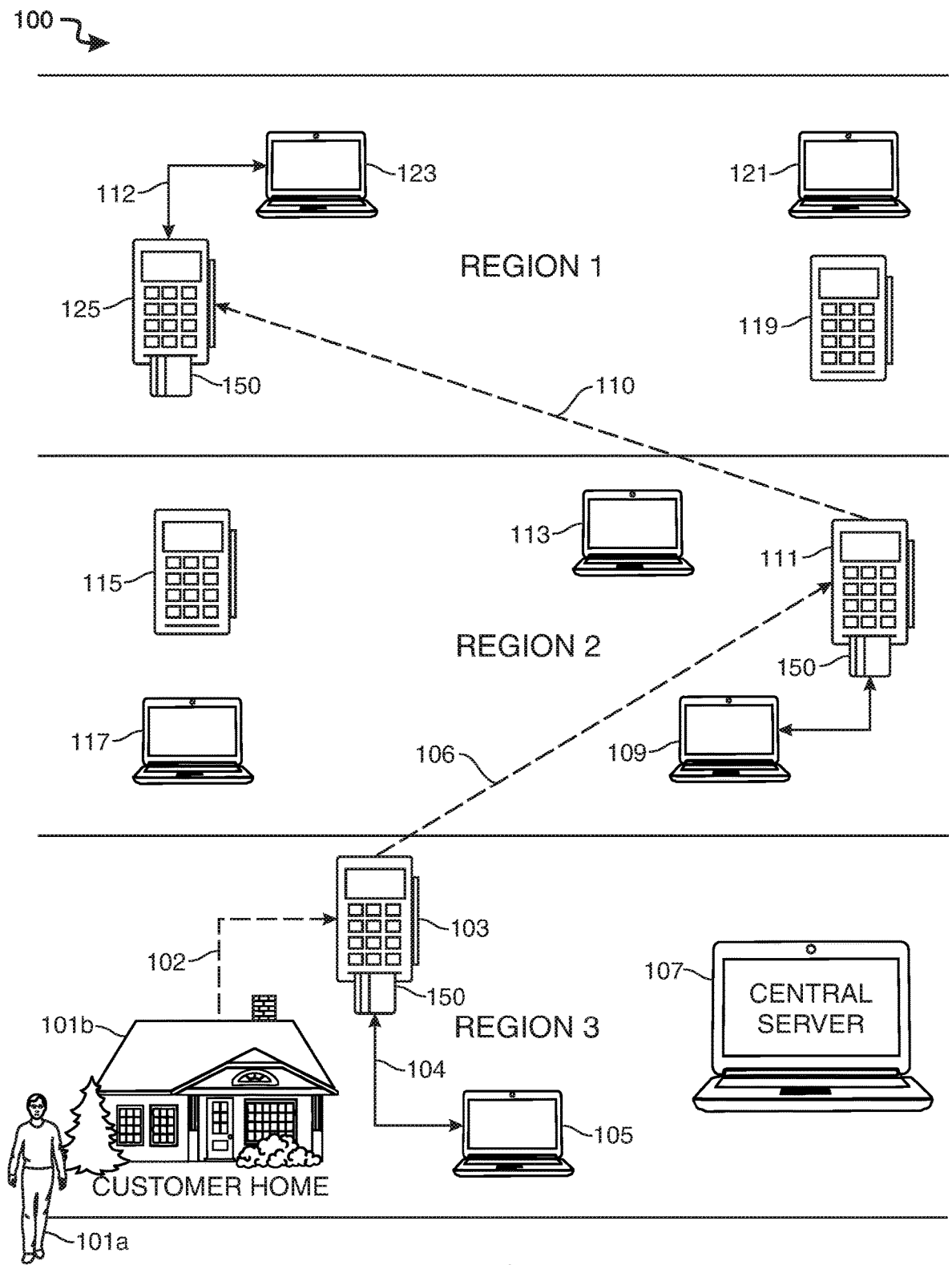
FIG. 1 shows an illustrative system and scenario in accordance with principles of the disclosure.

Apparatus for an edge-node computing architecture is provided. Apparatus may include an edge-node. The edge-node may be a computer server.

The edge-node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable an edge-node to perform various functions. For example, the non-transitory memory may store software applications used by an edge-node, such as an operating system, application programs, and an associated database. Alternatively, some or all of computer executable instructions of an edge-node may be embodied in hardware or firmware components of the edge-node.

Software application programs, which may be used by an edge-node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

An edge-node may support establishing network connections to one or more remote nodes. Such remote nodes may be edge-nodes, mobile devices or other computing devices. Edge-nodes may be personal computers or servers. An edge-node may communicate with remote nodes using a data port. The data port may include a network interface or adapter. The data port may include a communication circuit. An edge-node may include a modem, antenna or other communication circuitry for establishing communications over a network, such as the Internet. The communication circuit may include the network interface or adapter.

Via the data port and associated communication circuitry, an edge-node may access network connections and communication pathways external to the edge-node. Illustrative network connections may include a local area network ("LAN") and a wide area network ("WAN"), and may also include other networks. Illustrative communication pathways may include Wi-Fi, wired connections, Bluetooth, cellular networks, satellite links, radio waves, fiber optic or any other suitable medium for carrying signals.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Edge-nodes may include various other components, such as a display, battery, speaker, and antennas. Edge-nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

An edge-node may be, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Edge-nodes may utilize computer-executable instructions, such as program modules, executed by a processor. Software applications may include multiple program modules. Generally, program modules include routines, programs, objects, components, data structures, etc. that perform particular tasks or implement particular abstract data types. An edge-node may be operational with distributed computing environments where tasks are performed by remote processing devices that are linked through a communications network. In a distributed computing environment, program modules may be located in both local and remote computer storage media including memory storage devices. Edge-nodes may interact with a network of remote servers hosted on the Internet to store, manage, and process data (e.g., a cloud computing environment).

Edge-nodes may include a battery. The battery may be a power source for electronic components of the edge-node. For example, the battery may supply power to the display, the communication circuit and the processor circuit. In some embodiments, an edge-node may include a plurality of batteries. Edge-nodes may include solar panels that convert solar energy into electricity that power one or more components of an edge-node.

The edge-node may be positioned in a first location. The architecture may include a payment instrument. The payment instrument may store data in a magnetic strip, a bar code, a silicon chip, non-volatile computer readable media or any other suitable data storage device or format. Illustrative payment instruments may include a credit card, debit card, a check, a device that includes a contactless chip (such as an ISO14443-compliant contactless chip), a smart phone, a tablet computer, a transponder or any other suitable electronic purchasing devices.

A payment instrument may be associated with a digital wallet application. A digital wallet application may run on a mobile device and communicate with a merchant point-of-sale terminal ("MPOST"). The digital wallet application may transfer a token or other information associated with a payment instrument to the MPOST. Based on the information received from the digital wallet application, the MPOST may attempt to process a purchase transaction. A purchase transaction may include drawing on a line-of-credit or transfer funds to the merchant in exchange for a desired product. A payment instrument may securely store information provided by the digital wallet to the MPOST.

A customer (alternatively, "user") may purchase products from a merchant by presenting a payment instrument (or information associated with a payment instrument via a digital wallet application) at a MPOST. The purchase may be conducted through any suitable access channel provided by a merchant. The payment instrument may allow the customer to draw on a line-of-credit or transfer funds to the merchant in exchange for the desired product. The payment instrument may provide the customer/merchant access to funds or credit controlled by an issuing bank (the "issuer") associated with the payment instrument.

For example, customer funds may be held in an account at the issuing bank. Activities associated with the account may be administered by the issuer bank. Illustrative activities may include withdrawals, deposits, transfers and record keeping. Using the payment instrument, the customer may initiate one or more activities. For example, the customer may initiate a transfer of funds to a merchant and a debit to the customer account.

The merchant, using a MPOST, may receive the transfer request. The merchant may submit the transfer request to an acquiring bank (the "acquirer"). The acquirer may request that the issuing bank provide an authorization decision (e.g., "granted" or "denied") for the transfer request. The issuer may be provided an opportunity to provide an authorization decision for the purchase before extending credit on behalf of the customer or before implementing the transfer request.

Typically, by granting authorization for the transaction, the issuer accepts responsibility for subsequent costs associated with the purchase and transfer request. Subsequent costs may include settling the transaction, providing funds to the merchant, responding to allegations of fraud, chargebacks, or other events that arise after an authorization decision granting the transfer request has been provided. An issuer may decline to accept responsibility for a transaction by denying authorization for the transfer request.

The acquirer may request authorization from the issuer by submitting a transaction record to the issuer via a transaction processing network. The transaction record may identify products purchased, amount of the purchase, location of the purchase, identity of the merchant, customer information and payment instrument information. A transaction processing network provides computer resources that link acquirers, issuers and other transaction participants.

A transaction processing network may receive an authorization decision from an issuer and transmit the authorization decision to the acquirer. In response to receiving a granted authorization decision, the merchant may release the desired product to the customer. In response to receiving a denial authorization decision, the merchant may prompt the customer to provide an alternative payment method (e.g., cash).

When a "granted" authorization decision is provided by the issuer, the acquirer pays the merchant for (and thus "acquires") the purchase transaction. The transaction processing network (in communication with the issuer and the acquirer) may settle transactions between the issuer and the acquirer. A transaction settlement process may include a transfer of funds between two or more transaction participants.

Computer servers operating by the issuer may receive authorization requests from MPOSTs via the transaction processing networks. Such issuer computer system may need to provide authorization decision for a large number of transactions. For example, computer systems operated by a transaction processor may receive 150 million transactions per day that require authorization decisions. At peak demand computer systems may receive 65,000 transactions a minute. Such computer systems may be built with resources to handle 24,000 transactions per second. It would be desirable to reduce the number transactions processed by these computer systems. Reducing the number of transaction processed will reduce the expensive deployment of resources needed to process such large volumes of transactions.

The architecture may include an internal node. The internal node may be MPOST. For example, the internal node may be an MPOST be configured to capture payment instrument information stored on the payment instrument at a point of sale.

The internal node may be positioned in a first location. The internal node may be located in the same geographic region as the edge-node. A geographic region may be defined based on a region that uses a particular currency. A geographic region may be defined based on a mail code or any other suitable identifier of a region. The first location may defined by borders of a first geographic region that uses a first currency.

A payment instrument may be registered to a customer that lives in a second location. For example, the second location may be a home or business address of a customer. The second location (e.g., home location of the customer) may be defined by borders of a second geographic region that uses a specific currency.

The architecture may include a security scheme. The security scheme may be configured to authenticate a payment instrument presented by a customer. Authenticating the payment instrument may include requiring the customer provide a biometric feature, passcode or other credentials before providing payment instrument information to the MPOST. The security scheme may be configured to open a secure connection from the internal node to the edge-node. The security scheme may utilize the edge-node to processes a transaction as a local transaction occurring in the first location. Utilizing the edge-node to process the transaction locally bypasses a central computer server that would have typically processed the transaction.

Processing a transaction may include determining whether to grant or deny an authorization request. Processing a transaction may include determining whether the customer has an adequate amount of funds or credit needed to grant an authorization request. Processing the transaction may include determining whether the transaction complies with restrictions associated with the first location.

The edge-node may be configured to provide an authorization decision for the transaction without transmitting payment instrument information outside the first location. Such processing may be considered to be "local."

The security scheme may configure the internal node to require credentials for authorizing use of the payment instrument information before processing the transaction. Such credentials may include biometric features, a password, a token or any other suitable credential.

The security scheme may run on the edge-node. The security scheme may run on the MPOST. The security scheme may run on the payment instrument. In some embodiments, the computer code for the security scheme may be stored on the payment instrument. The payment instrument may store information that indicates to the edge-node or MPOST an appropriate security scheme that needs to be applied to gain access to payment instrument information associated with the payment instrument. An appropriate security scheme may include enhanced security features configured by the customer, issuer, merchant or any other transaction participant.

The edge-node may be a first edge-node. Prior to processing the transaction, the first edge-node may be configured to detect a presence of the payment instrument in a first location. For example, the payment instrument may be a mobile device. The first edge-node may detect movement of the mobile device in the first location using a location sensor embedded in the mobile device.

Based on detected movement of the payment instrument, the first edge-node may estimate a trajectory of the payment instrument. Based on the trajectory, the first edge-node may connect with a second edge-node in a second location. The first edge-node may obtain records associated with the payment instrument and stored in the second location. The first edge-node may locally store the obtained records to process an authorization decision request received from a local MPOST.

Based on the records obtained from the second edge-node, the first edge-node may generate information needed to locally process a transaction initiated by the payment in the first location. For example, the first edge-node may create an account showing that the customer holds funds locally in a currency used in the first location. The first edge-node may store a record of the account locally in its internal memory.

The first edge-node may provide an authorization decision using information generated based on the records it received from the second edge-node, and now stores locally. After obtaining records from the second edge-node, the first edge-node may provide authorization decisions locally within first location without contacting and consuming computing resources of the second edge-node.

The security scheme may be unable to open a secure connection from the internal node to the edge-node. For example, a communication network may be down or otherwise unavailable. In such scenarios, the security scheme may be configured to relay the payment instrument information to the second location. When the payment instrument information is relayed to the second location, the transaction may take longer to process than when the transaction is processed in the first location by the local edge-node.

The internal node may be one of a plurality of internal nodes. For example, each internal node may be a MPOST. Each internal node may run an application program interface that controls access to the local edge-node. The plurality of internal nodes may each be configured to access the local edge-node to process transactions initiated by payment instruments. Transactions initiated by the payment instrument would typically be forwarded to a computer system in the second location for processing. Processing those transactions locally in the first location, where the payment instrument is now physically located, reduces a computational processing burden on computer systems in the second location.

The security scheme may be stored on the payment instrument. For example, a payment instrument may include a microchip. The microchip may implement "EMV" compliant protocols. EMV is a technology that derives its name from the companies (Europay, MasterCard, and Visa) that developed the technology. The microchip may be configured to receive power from a MPOST. The MPOST may execute the security scheme stored on the EMV chip. In some embodiments, in response to receiving the power, the microchip may execute the security scheme.

A MPOST may emit high frequency signals that provide power to a microchip of a payment instrument. High frequency signals may be signals that have a transmission range that is less than 50 centimeters ("cm"). In some embodiments, a payment instrument be inserted into a MPOST and receive power via electrical contacts of the MPOST.

An edge-node computing architecture is provided. The architecture may include a first computer system. The first computer system may be registered to a first financial institution. The first computer system may be operated by a first financial institution. The architecture may include a second computer system. The second computer system may be registered to a second financial institution. The second computer system may be operated by a second financial institution.

The architecture may include an edge-node. The edge-node may be configured to use artificial intelligence to identify and pull selected data records from the first and/or second computer systems. The artificial intelligence may include estimating a trajectory of a payment instrument to determine where the payment instrument will be located at a future time. Based on the anticipated location of the payment instrument, an edge-node in a location along the trajectory may obtain targeted records from the first/second computer systems. By obtaining the targeted records before the payment instrument enters a location, the edge-node may be ready to locally process any transactions initiated by the payment instrument after entering the location.

For example, when the payment instrument eventually enters a location along the trajectory, the edge-node may receive a request to transfer funds between a first account registered to the first institution and a second account registered to the second institution. The edge-node may process the transfer request based on the selected data records stored locally on the edge-node without establishing a connection to the first or second computer systems.

Processing the transfer locally on the edge-node may reduce a computational burden on the first and second computer systems. Processing the transfer locally by the edge-node may reduce computational resources maintained by the first and second computer systems. Processing the transfer locally on the edge-node may reduce a volume of incoming network traffic to the first and second computer systems.

The first computer system may be located in a first location. The second computer system may be located in a second location. The edge-node may be configured to convert data records received from the first computer system into a local format used in the second location. The edge-node may be configured to convert data records received from the second computer system into a local format used in the first location.

A local format may include storing an account balance in a local currency used in the first or second locations. The edge-node may be configured to process transactions, such as transfer requests, as if they occurred locally in the first location. The edge-node may be configured to process the transfer request as if it occurred locally in the second location.

The architecture may include a security scheme. The security scheme may control access to the edge-node. The security scheme may control access to the edge-node by a first payment instrument registered to the first financial institution (e.g., a first issuer). The security scheme may control access to the edge-node by a second payment instrument registered to the second financial institution (e.g., a second issuer). The security scheme may impose different authentication requirements on the first and second payment instruments. Each issuer may impose distinct authentication requirements.

Methods for reducing network traffic between a first location and a second location are provided. Methods may include receiving a transfer request from a customer registered to a first location. The customer may request a transfer of currency to a recipient located in a second location. Methods may include, at an edge-node positioned in the second location, creating an edge account for the customer. The edge account may hold currency used locally in the second location. The currency used locally in the second location may be different from currency used locally in the first location.

In response to receiving the transfer request, methods may include transferring currency from the local edge account to a local recipient without communicating with a computer system in the first location prior to completing the transfer.

Methods may include creating the edge account in response to detecting a presence of the customer in the second location. The edge node account may be created before the customer initiates any transactions or requests in the second location. The edge node account may be created before the customer enters the second location.

Methods may include deploying a security scheme that controls access by the customer to a local edge-node. Methods may include deploying a security scheme that controls access by the customer and local recipient to the local edge-node. The security scheme may utilize a first protocol to provide access to the customer and a second protocol to provide access to the local recipient. For example, a local recipient may access the local edge node to receive funds from the customer. The local recipient may be a local merchant or local beneficiary of the transfer request.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows apparatus and scenario 100. In scenario 100, customer 101aa lives in home 101b in region 1. Payment instrument 150 is also registered to region 1. Customer 101a uses payment instrument 150 to initiate a purchase transaction using MPOST 103 in region 1. Transactions captured by MPOST 103 are processed using local edge-node 105. Edge-node 105 may process the transactions without using computing resources of central server 107.

Customer 101a may travel to region 2. In region 2, customer 101a uses payment instrument 150 at MPOST 111 to initiate a purchase transaction. Transactions captured by MPOST 111 are processed using local edge-node 109. Prior to arrival of customer 101a in region 2, edge-node 109 may communicate with central server 107. Edge-node 109 may obtain transaction records from central server 107 that are needed to process transactions captured by MPOST 111. Edge-node 109 may obtain transaction records from central server 107 that are formatted to process transactions within region 2. For example, the transaction records may include information in a currency used within region 2.

One edge-node may communicate with other edge-nodes. For example, edge-node 109 may communicate with edge-node 105. Each time an edge-node processes a transaction captured by a MPOST, the edge-node may broadcast information to other edge-nodes. For example, edge-node 105 may broadcast to edge-nodes 109 and 113 that it has processed a transaction initiated by payment instrument 150. Based on the broadcast information, edge-nodes 109 and 113 may determine an expected trajectory of customer 101a. Based on the trajectory, edge-nodes 109 and 113 may expect to process a transaction initiated by customer 101a using payment instrument 150 at MPOSTs 111 or 115.

Edge-nodes 109 and 113 may request transaction records from central server 107 that are needed to process any expected transactions. Edge-nodes 109 and 113 may schedule a request for the transaction records at a time when utilization of computational resources provided by central server 107 is expected to be low. Edge-nodes 109 and 115 may obtain the transaction records from central server 107 before MPOST 111 or 115 requests processing of a transaction initiated using payment instrument 150.

Based on transactions captured by edge-node 109, edge-nodes 123 and 121 may request transaction records from central server 107. Edge-nodes 123 and 121 may obtain transaction records from central server 107 that are formatted to locally process region 3 transactions. Edge-node 123 may obtain the transaction records before customer 101a initiates a transaction within region 3. Edge-node 123 may obtain the transaction records such that when MPOST 125 captures a transaction initiated using payment instrument 150, edge-node 123 may process the captured transactions without any further communication with central server 107.

A trajectory of customer 101a (e.g., pathways 102, 106 and 110) may be utilized by an artificial intelligence algorithm to identify and request transaction records from central server 107 that may be needed to process future transactions initiated by customer 101a using payment instrument 150.

Figure 2:
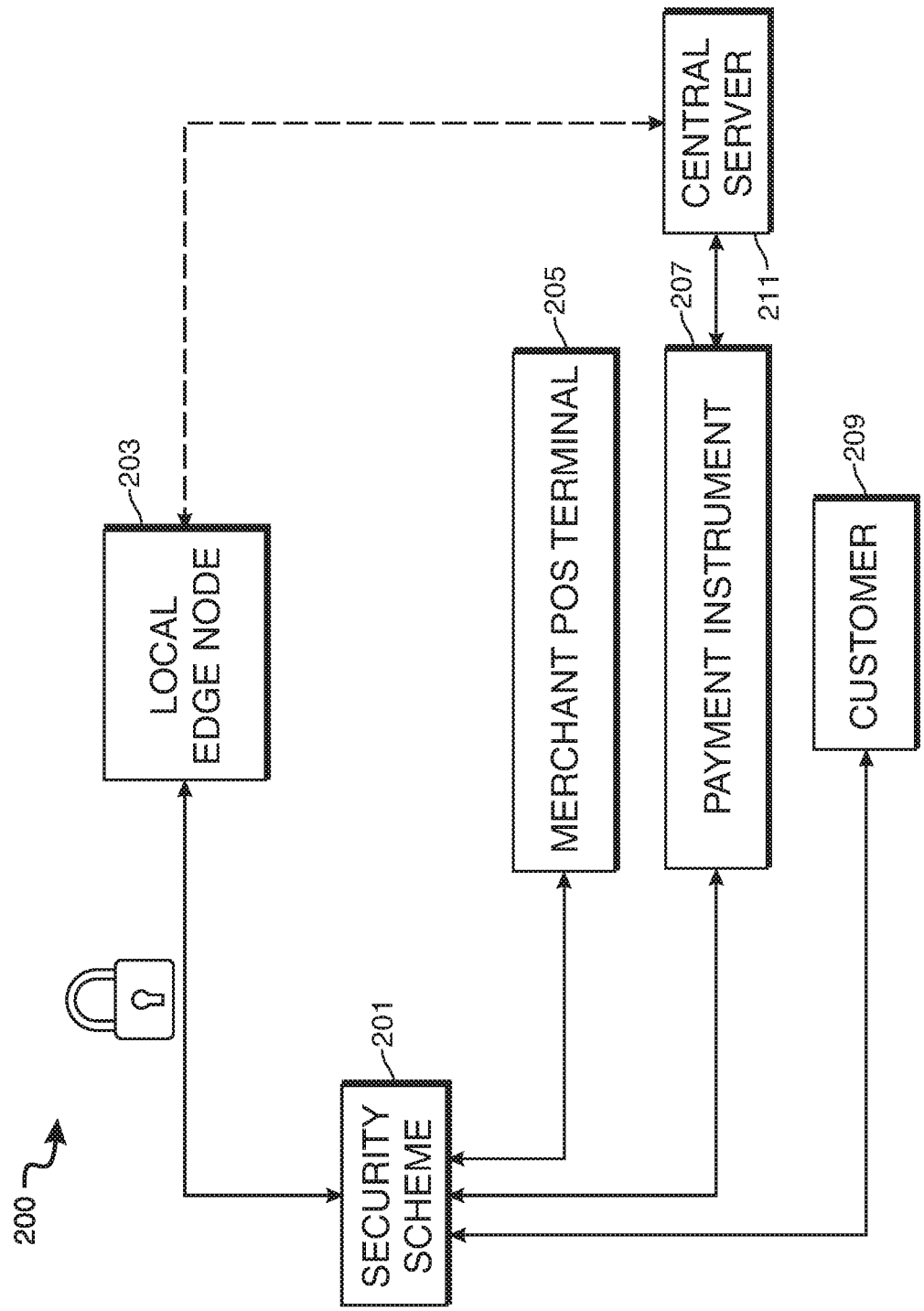
FIG. 2 shows an illustrative system and scenario in accordance with principles of the disclosure.

FIG. 2 shows illustrative system 200. System 200 includes security scheme 201. Security scheme 201 provides a secure interface for MPOST 205, payment instrument 207 and customer 209 to interact with local edge-node 203.

For example, before forwarding a transaction initiated by payment instrument 207 at MPOST 205, security scheme 201 may require authentication from customer 209. Such authentication may include submitting a biometric feature or entry of a code at MPOST 205. Security scheme 201 may apply different authentications in different regions. For example, in a region that is associated with a high degree of chargebacks, or anomalous transaction activity, security scheme 201 may require additional informational items to authenticate customer 209.

Security scheme 201 may require a higher level of authentication when a transaction will be process by local edge-node 203 than when a transaction will be processed directly by central server 211. Central server 211 may include information that may be used to authenticate a customer or transaction that is not available to a local edge-node. For example, local edge-node 203 may only include a sub-set of information stored on central server 211. Local edge-node 203 may therefore not possess informational items (e.g., historical transaction records) available to central server 211 that may be used to authenticate customer 209 as rigorously as central server 211.

Figure 3A:
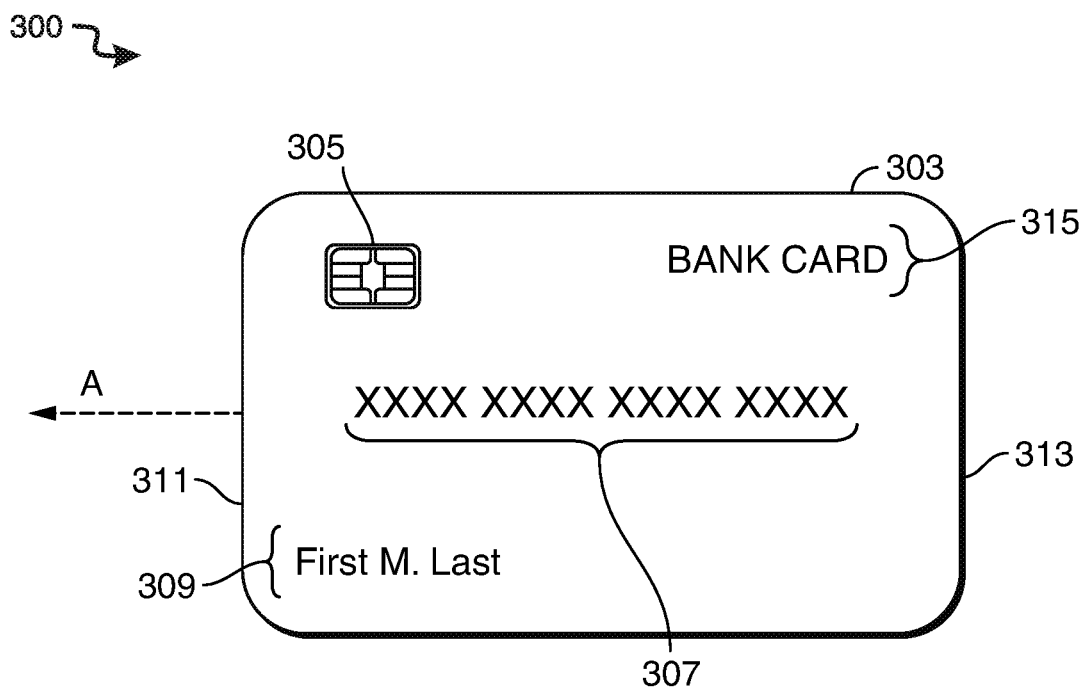
FIG. 3A shows illustrative apparatus in accordance with principles of the disclosure.

FIG. 3A shows illustrative payment instrument 300. Payment instrument 302 includes microchip 305. Payment instrument 300 includes informational items 315 (issuer), 307 (card number) and 309 (customer name). Microchip 305 is positioned relative to informational items 315, 307 and 309. The location of microchip 305 may be an industry-standard location defined by the International Organization for Standardization ("ISO") and the International Electrotechnical Commission ("IEC"). Exemplary standards for the location of microchip 205 include ISO/IEC 7816 and/or ISO/IEC 14443.

Figure 3B:
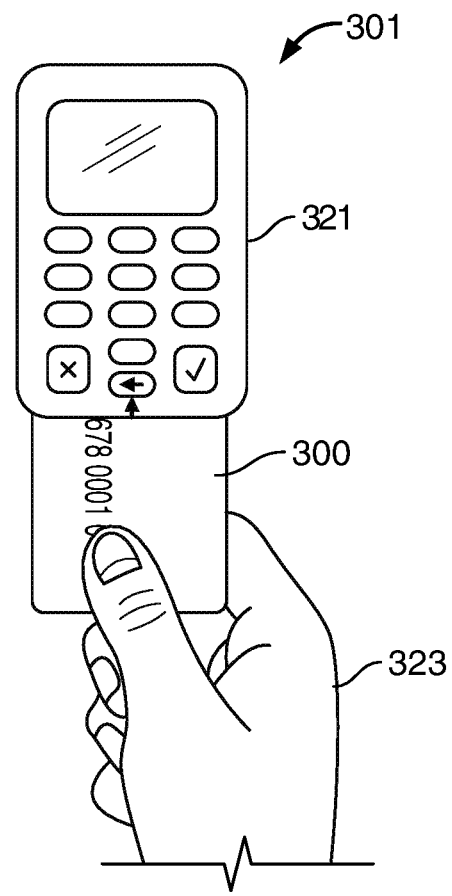
FIG. 3B shows illustrative apparatus in accordance with principles of the disclosure.

FIG. 3B shows payment instrument 300 and MPOST 321. Microchip 305 may be positioned such that when leading edge 311 of payment instrument 300 is inserted into MPOST 321 by customer 323 in direction A, microchip 305 will be positioned to be readable by MPOST 321. When leading edge 311 of payment instrument 300 is inserted into MPOST 321 in direction A, microchip 305 may be positioned, inside MPOST 321, in an industry-standard location.

Microchip 305 may store computer executable instructions for that when executed by a processor on a computer system implement a security scheme. When customer 323 inserts payment instrument 300 into MPOST 321, the security scheme may configure MPOST 321 to authenticate customer 323. For example, the security scheme may require specific information items or credentials based on a location of MPOST 321. The security scheme may require specific information items or credentials based on a distance of MPOST 321 from a registered location associated with customer 323 (e.g., home 101b shown in FIG. 1) or payment instrument 300.

Figure 4A:
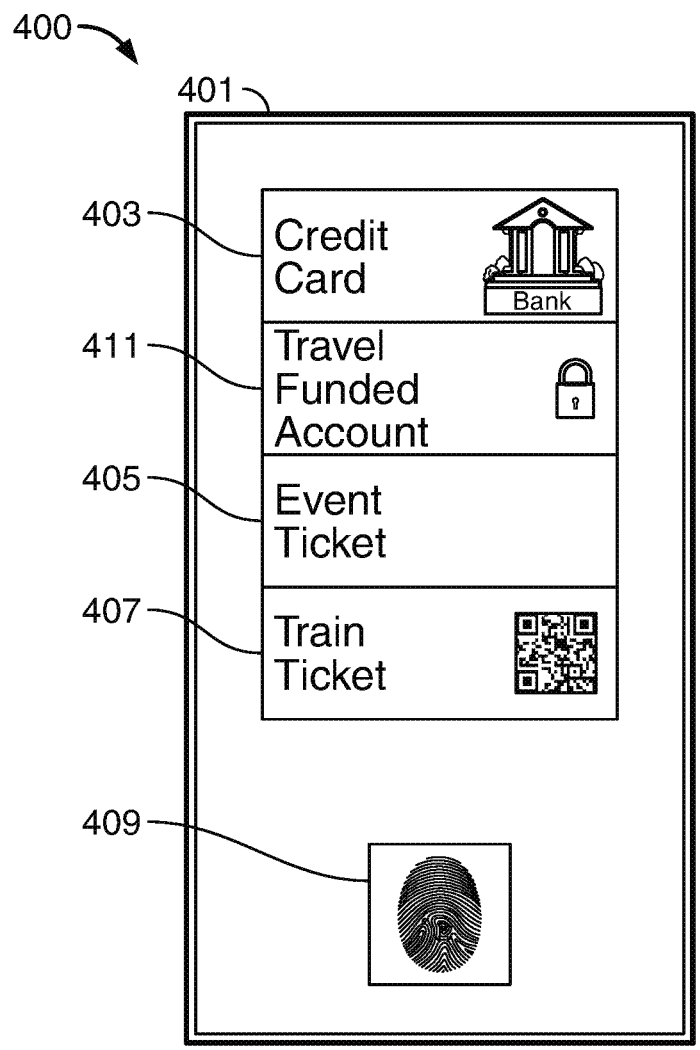
FIG. 4A shows illustrative apparatus in accordance with principles of the disclosure.

FIG. 4A shows illustrative operational screenshot 400 of digital wallet application 401. Digital wallet application 401 may be executed and run on a payment instrument used by a customer. The payment instrument may be a mobile device such as a smartphone or tablet. Digital wallet application 401 includes virtual credit card 403. Digital wallet application 401 includes virtual event ticket 405 and virtual train ticket 407.

Digital wallet application 401 also includes travel funded account 411. Travel funded account 411 may be added to digital wallet application 401 in response to detecting that a customer (e.g., 101a shown in FIG. 1) has travelled to a region that uses a local currency different from a currency used in a region that includes a registered address (e.g., 101b) of the customer. Travel funded account 411 may require validation of biometric feature 409 to access travel funded account 411.

Transactions initiated using travel funded account 411 are processed using a local edge-node (e.g., 105, 109 and 123 all shown in FIG. 1) in a region where the mobile device running digital wallet application 401 is currently located. Using travel funded account 411 may provide direct access to funds or credit stored in a local currency on a local edge-node in a region where a customer is currently located.

Figure 4B:
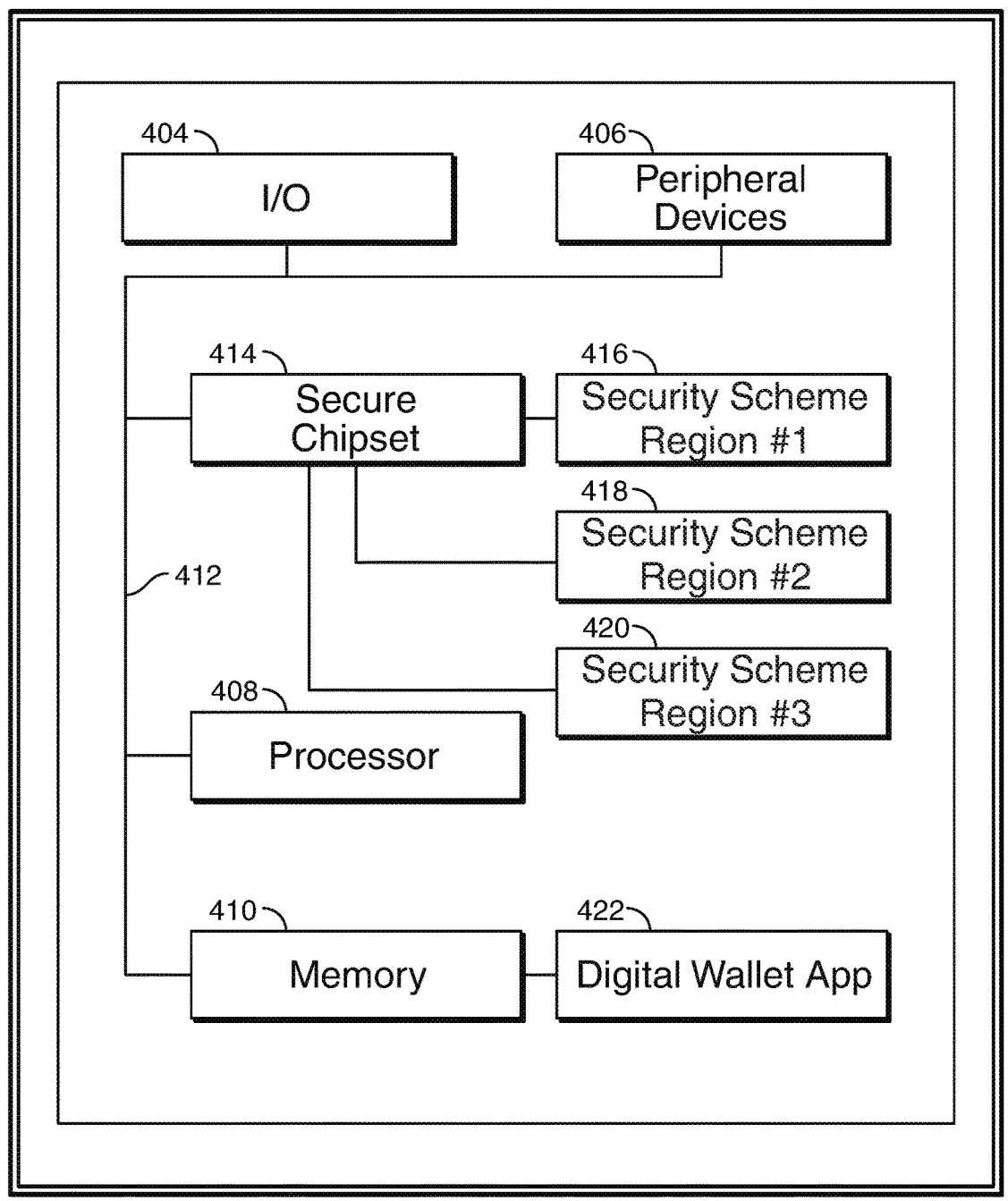
FIG. 4B shows illustrative apparatus in accordance with principles of the disclosure.

FIG. 4B shows illustrative hardware and digital information components 402 that may be included in a payment instruments disclosed herein. Such payment instruments include a mobile device, payment instrument 150, payment instrument 207, payment instrument 300 and digital wallet application 401. Components 402 may include one or more integrated circuits which may be configured to perform any suitable logical operation.

Components 402 include secure chipset 414. Secure chipset 414 may be a microchip. Secure chipset 414 may be an "isolated" chip on mobile device 401 that has limited interaction with the rest of the mobile device's operating system.

For example, secure chipset 414 may be "isolated" because it is only accessible when a mobile device is within communication range of a merchant POS terminal. Secure chipset 414 may only be accessed by the merchant POS terminal and not by the operating system running on the mobile device.

Secure chipset 414 may store payment instrument information. Illustrative payment instrument information may include:

Brand (i.e., issuer, transaction network, acquirer)
Customer name
Expiration date
Payment instrument security code ("CSC")
Payment instrument verification data ("CVD")
Payment instrument verification value ("CVV," "CVV2," "iCVV" or "Dynamic CVV")
Payment instrument verification value code ("CWC")
Payment instrument verification code ("CVC" or "CVC2")
Verification code ("V-code")
Payment instrument code verification ("CCV")
Signature panel code ("SPC")
Customer identification number ("CID")
Payment instrument account number
Registered address
Affinity Product (i.e., rewards card, platinum card, signature card, ect.)

Secure chipset 414 may store a token. The token may be a series of randomly generated numbers that correspond to payment information. The token may be transmitted from secure chipset 414 to a MPOST. The MPOST may forward the token to an issuer associated with the token. The issuer may hold a key needed to decipher the token and correlate the token to a specific account. The issuer may provide the MPOST with an authorization decision that approves or denies the purchase transaction. The token may be dynamically changed with each transaction so that a token is only usable for a single transaction.

Secure chipset 414 may also store one or more security schemes that control release of payment instrument information by a payment instrument to a MPOST or a local edge-node. Components 402 include security scheme 416 stored on secure chipset 414. Security scheme 416 may be configured to execute a specific authentication routine when a payment instrument is located in region 1. For example, region 1 (shown in FIG. 1) may be a region that includes a registered address (e.g., customer home address 101*b*) associated with virtual credit card 403. Security scheme 416 may impose a less rigorous authentication than security scheme 418 (region 2) because customer 101*a* is expected to use virtual credit card 403 more frequently in region 1 compared to region 2.

Security scheme 420 (region 3) may impose a less rigorous authentication than security scheme 418 (region 2). MPOSTs and local edge-nodes in region 3 may be considered more secure than MPOSTs and local edge-nodes in region 2.

Components 402 include I/O circuitry 404, which may include a transmitter device, a receiver device and may interface with fiber optic cable, coaxial cable, telephone lines, wireless devices, PHY layer hardware, a keypad/display control device or any other suitable encoded media or devices. I/O circuitry may include a near-field communication chip for wireless communication with a MPOST.

Components 402 include peripheral devices 406, which may include counter timers, real-time timers, power-on reset generators or any other suitable peripheral devices. Components 402 include logical processing device 408, which may compute data structural information, structural parameters of the data, run an artificial intelligence algorithm and estimate a customer trajectory or identify a local edge-node that will receive a transaction initiated by the customer.

Components 402 include machine-readable memory 410. Memory 410 may store applications used by a payment instrument, such as an operating system, application programs, web browser and a database. Applications may include digital wallet application 401.

Components 402 may be coupled together by a system bus or other interconnections 412 and may be present on one or more circuit boards. In some embodiments, components 402 may be integrated into a single chip. The chip may be silicon-based.

Figure 5:
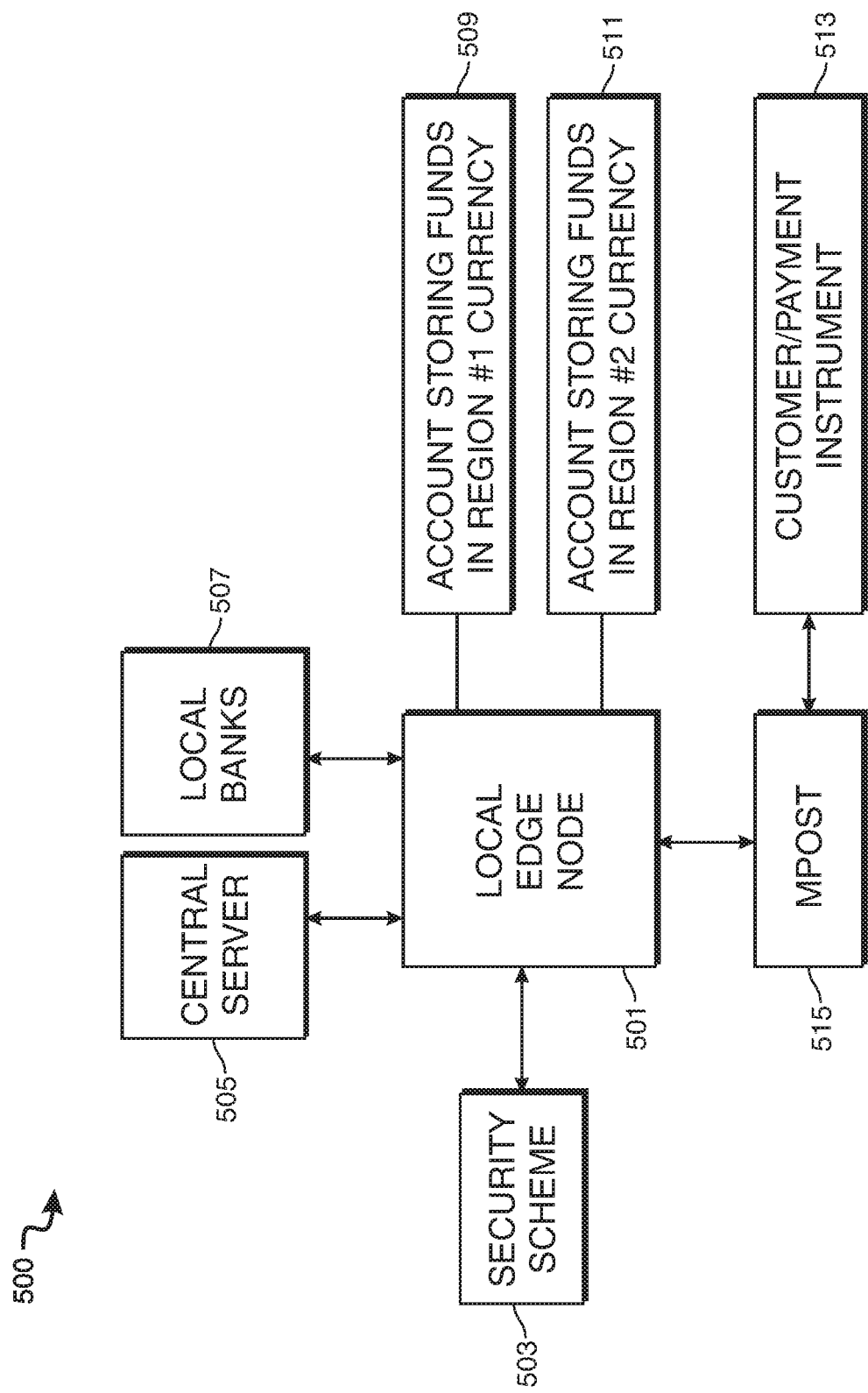
FIG. 5 shows an illustrative system in accordance with principles of the disclosure.

FIG. 5 shows illustrative system 500. System 500 includes local edge-node 501. Local edge-node 501 includes a communication connection to MPOST 515. MPOST 515 may capture payment instrument information from payment instrument 513. MPOST 515 may transfer captured payment instrument information to local edge-node 501. Local edge-node 501 may process a transaction based on the received payment instrument information. For example, local edge-node 501 may grant an authorization request. Local edge-node 501 may initiate a transfer of funds from account 509 to an account at local banks 507.

In some embodiments, local edge-node 501 may transfer funds from an account at local banks 507 to an account (e.g., 509 or 511) stored locally on local edge-node 501. Local edge-node 501 may obtain information needed to open accounts 509 and 511 from central server 505. Account 509 may be associated with a first customer. Account 509 may be associated with a second customer.

After accounts 509 and 511 are open and stored locally on local edge-node 501, local edge-node 501 may process transactions without further communication with central server 505. Processing transactions locally may include issuing authorization decisions and transferring funds between accounts 509 and 511. A transfer of funds from account 509 to account 511 may allow a visiting customer to transfer funds to a local resident using domestic rules and protocols. Local edge-node 501 may deploy security scheme 503 to authenticate a customer or payment instrument before processing a transaction. Local edge-node 501 may utilize security scheme 503 for MPOST 515 to obtain information from payment instrument 513.

In some embodiments, accounts 509 and 511 may associated with the same customer. Local edge-node 501 may offer an option to process a transaction using a local currency, a currency of a customer's home region or any other suitable currency.

Local edge-node 501 may not be operated by any of local banks 507. Security scheme 503 may provide a level of security for local edge-node 501 to interact with computer systems of local banks 507. Local banks 507 may utilize local edge-node 501 to process transactions close to a location where the transaction occurs. Local banks 507 may utilize local edge-node 501 to process transactions when at least one transaction participant is associated with a registered address outside the local region.

Local edge-node 501 may periodically communicate with central server 505. The periodic communications may inform central server 505 of transactions that have been processed locally by local edge-node 501. The periodic communications may synchronize transaction records maintained by central server 505 and local edge-node 501.

Figure 6:
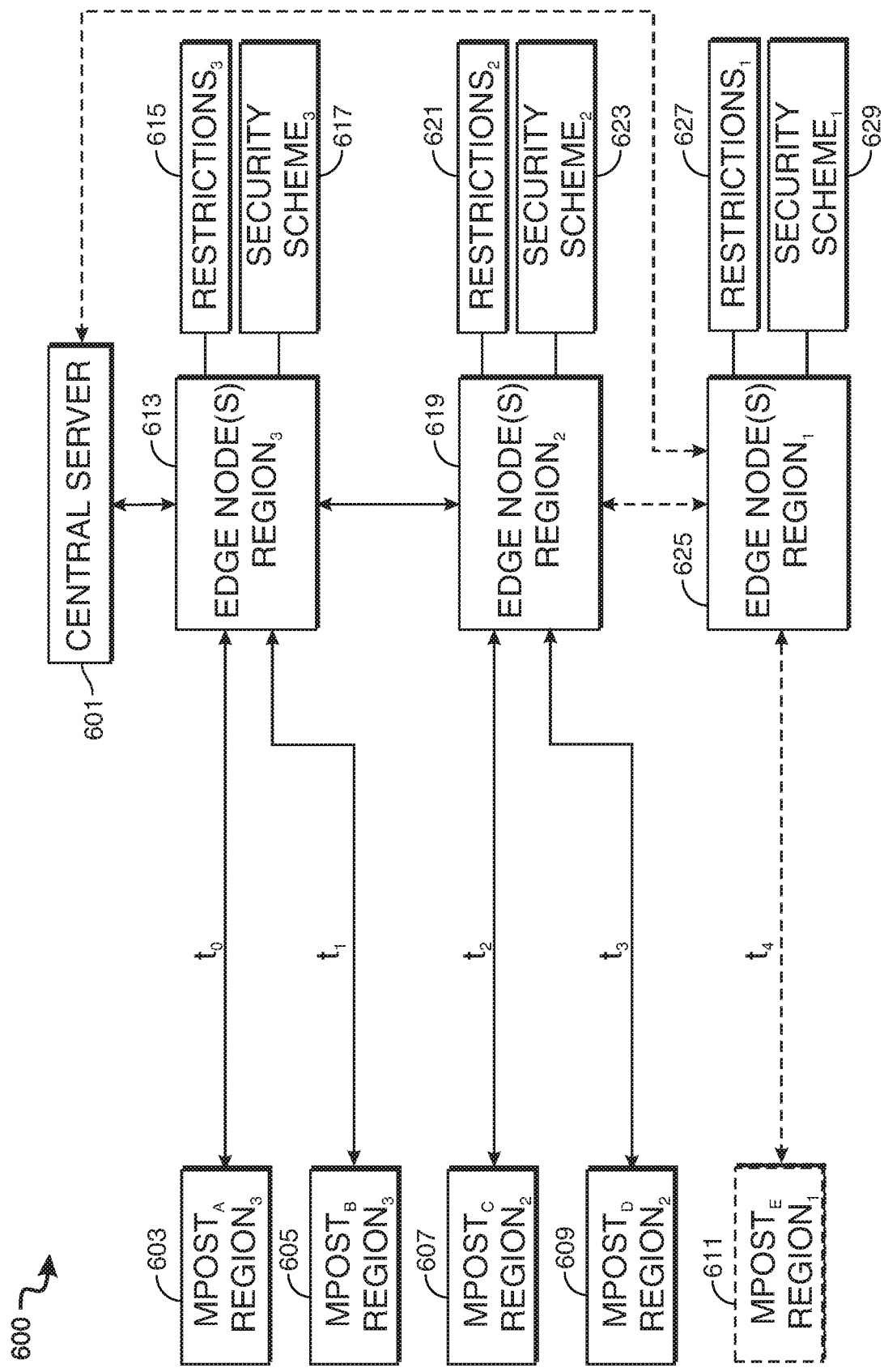
FIG. 6 shows an illustrative system and scenario in accordance with principles of the disclosure.

FIG. 6 shows illustrative scenario 600. In scenario 600, at $t_0$ MPOST$_A$ (positioned in region 3, shown in FIG. 1) submits a transaction for processing to edge-nodes 613 in region 3. At $t_1$, MPOST$_B$ (also positioned in region 3) submits a transaction for processing to edge-nodes 613 in region 3. A processing of transactions may be distributed across two or more edge-nodes in region 3. Edge-nodes 613 process transactions without communicating with central server 601.

Edge-nodes 613 process the transaction in accordance with security scheme 617. Edge-nodes 613 may apply restrictions 615 to transactions initiated in region 3. Restrictions 615 may impose any suitable restriction. Illustrative restrictions may include capping a transfer amount, limiting a total number of transactions or limiting a total number of transactions that may be processed by edge-nodes 613 without communication with central server 601.

Scenario shows that $t_2$, MPOST$_c$ (positioned in region 2, shown in FIG. 1) submits a transaction for processing to edge-nodes 619 in region 2. At $t_3$, MPOST$_D$ (also positioned in region 2) submits a transaction for processing to edge-nodes 619. Edge-nodes 613 process the transaction without communicating with central server 601. Edge-nodes 619 process the transactions received at $t_2$ and $t_3$ in accordance with restrictions 621 and security scheme 623.

Scenario 600 shows that edge-nodes 625 receive transaction information from edge-nodes 613 and 619. Edge-nodes 615 may receive transaction information from edge-nodes 613 via edge-nodes 619. Based on communication with edge-nodes 613 and 619, between $t_0$ and $t_4$, and prior to $t_4$, edge-nodes 625 may request transaction information from central server 601 for processing transactions that may be required for edges-nodes 625 to process transactions received on or after $t_4$.

Scenario shows that at $t_4$, edge-nodes 625 are ready to process transactions received from MPOST$_E$ in region 1 (shown in FIG. 1) without communicating with central server 601. At $t_4$, MPOST$_E$ in region 1 may submit a transaction for processing to edge-nodes 625. Edge-nodes 625 will process the transactions received at $t_4$ in accordance with local restrictions 627 and local security scheme 629.

Figure 7:
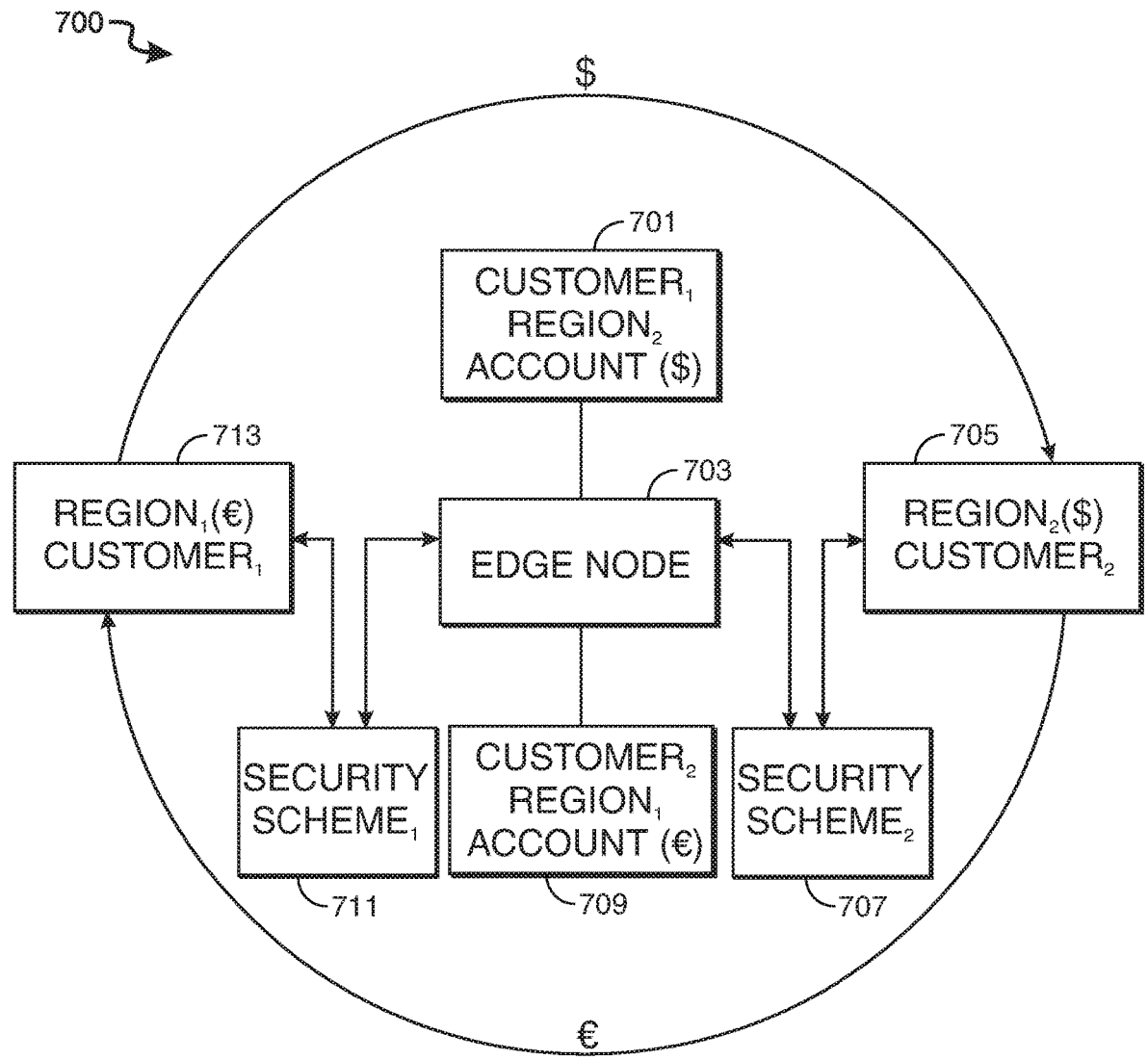
FIG. 7 shows an illustrative system and scenario in accordance with principles of the disclosure.

FIG. 7 shows illustrative system 700. System 700 includes customer accounts 705. Customer accounts 705 may correspond to accounts stored on a central server in a location registered to customer$_2$. Customer accounts 705 store currency in dollars, which may be a native currency in the registered location associated with customer$_2$.

System 700 includes customer accounts 713. Customer accounts 713 may correspond to accounts stored on a central server in a location registered to customer$_1$. Customer accounts 713 may store currency in euros, which may a native currency in in the registered location associated with customer$_1$.

System 700 includes edge-node 703. Edge-node 703 may store local customer accounts 701. The local customer$_1$ accounts 701 may be created based on customer$_1$ accounts 713. Local customer$_1$ accounts 701 may store currency in dollars. When customer$_1$ travels to a region that locally uses dollars, transactions may be processed by edge-node 703 using locally stored accounts 701. Transactions processed using local accounts 701 may not require communication with the central server storing accounts 713.

Edge-node 703 may apply security scheme 711 when locally processing transactions for customer$_1$ and security scheme 707 when locally processing transactions for customer$_2$.

Edge-node 703 may store local customer$_2$ accounts 709. The local customer$_2$ accounts 709 may be created based on customer$_2$ accounts 705. Local customer$_2$ accounts 709 may store currency in euros. When customer$_2$ travels to a region that locally uses euros, transactions may be processed by edge-node 703 using locally stored accounts 709. Transactions processed using local accounts 709 may not require communication with the central server storing accounts 705.

Edge-node 703 may apply security scheme 707 when processing transactions for the customer$_2$ associated with accounts 709 or 705. Security scheme 707 may be different than security scheme 711.

FIG. 7 also shows that customer$_1$ (registered to a euro currency region) when located in a dollar currency region may transfer dollars to customer$_2$ using accounts 701. When customer$_2$ is in a euro currency region, customer$_2$ (registered to a dollar currency region) may transfer euros to customer$_1$ using accounts 709

Thus, apparatus and methods for an LOCAL EDGE-NODE SERVER are provided. Persons skilled in the art will appreciate that the present disclosure can be practiced by other than the described embodiments, which are presented for purposes of illustration rather than of limitation. The present disclosure is limited only by the claims that follow.

What is claimed is:

1. An edge-node computing architecture that reduces a computation burden processed by sub-systems of the computing architecture and a volume of incoming network traffic received by the sub-systems of the computing architecture, the computing architecture comprising:
 a first computer system registered to a first financial institution;
 a second computer system registered to a second financial institution; and
 an edge-node configured to:
  compute a trajectory of a payment instrument based on detected movement of and transaction activity associated with the payment instrument;
  based on the trajectory and using artificial intelligence, before receiving a transaction request from within a location along the trajectory:
   identify and pull selected data records from the first and second computer systems;
   convert data records received from the first computer system into a local format used in the location along the trajectory; and
   convert data records received from the second computer system into the local format;

receive a request in the local format and initiated by the payment instrument to transfer funds between a first account registered to the first institution and a second account registered to the second institution; and process the request to transfer funds based on the selected data records stored locally on the edge-node in the local format without establishing a connection to the first or second computer systems.

2. The edge-node computing architecture of claim 1 wherein:

the first computer system is located in a first location along the trajectory;

the second computer system is located in a second location along the trajectory; and the edge-node is configured to convert:

data records received from the first computer system into the local format used in the second location; and data records received from the second computer system into the local format used in the first location.

3. The edge-node computing architecture of claim 2 wherein the edge-node is further configured to process the request to transfer funds as if it occurred in the first location.

4. The edge-node computing architecture of claim 2 wherein the edge-node is further configured to process the request to transfer funds as if it occurred in the second location.

5. The edge-node computing architecture of claim 1 wherein the edge-node is further configured to process the request to transfer funds as if it occurred in a target geographic location along the trajectory.

6. The edge-node computing architecture of claim 1 further comprising a security scheme that controls access to the edge-node by:

a first payment instrument registered to the first financial institution; and a second payment instrument registered to the second financial institution.

* * * * *